Oct. 13, 1970 G. E. FENNER 3,534,290

SEMICONDUCTOR LASER BEACON FOR ROTATING AN OUTPUT BEAM

Filed Feb. 1, 1967

Inventor:
Gunther E. Fenner,
by Marvin Snyder
His Attorney.

3,534,290
SEMICONDUCTOR LASER BEACON FOR ROTATING AN OUTPUT BEAM

Gunther E. Fenner, Schenectady, N.Y., assignor to General Electric Company, a corporation of New York Filed Feb. 1, 1967, Ser. No. 613,328
The portion of the term of the patent subsequent to Apr. 1, 1986, has been disclaimed
Int. Cl. H01s *3/18*
U.S. Cl. 331—94.5 10 Claims

ABSTRACT OF THE DISCLOSURE

A cylindrically-shaped semiconductor diode laser wherein the p-n junction lies in a plane perpendicular to the longitudinal axis of the diode. By establishing suitably-shaped grooves in one end of the cylinder and individually energizing the regions defined by the grooves in predetermined sequence, the laser beam can be made to rotate about the longitudinal axis of the diode at a rate which is controllable from the energizing circuitry.

BACKGROUND OF THE INVENTION

This invention relates to semiconductor junction lasers, and more particularly to means for electronically displacing a beam of stimulated coherent radiation emitted from a cylindrically-shaped semiconductor junction diode so as to achieve controllable rotation of the beam about the longitudinal axis of the diode.

Semiconductor junction diodes adapted to emit coherent radiation are described in R. H. Hall, U.S. Pat. No. 3,245,002, issued Apr. 5, 1966 and assigned to the instant assignee. Diodes of this type are herein referred to as semiconductor junction lasers.

The advent of semiconductor junction lasers has enabled highly efficient production of stimulated coherent radiation of energy, including visible and infrared light, as well as microwaves. The wavelengths of electromagnetic radiation emitted by such lasers depend upon the bandgap, or energy difference between the conduction and valence bands of the particular semiconductor.

Heretofore, a change in position of the emitted beam of radiation has been achieved by application of a magnetic field to a cylindrical junction diode wherein the p-n junction is cylindrically-shaped, as described in G. E. Fenner U.S. patent application Ser. No. 492,181 filed Oct. 1, 1965, and assigned to the instant assignee. In addition, linear beam scanning without requiring physical movement of either the laser or at least some part of the optical system through which the beam is directed has also been achieved in the manner shown and described in G. E. Fenner U.S. patent application Ser. No. 532,417, filed Mar. 7, 1966, now U.S. Pat. No. 3,436,679 and assigned to the instant assignee.

The present invention concerns a semiconductor junction laser having provision to displace or deflect the emitted beam through 360° of rotation by constructing the diode in a right circular cylindrical configuration having a plane p-n junction therein parallel to the ends of the cylinder. One of the opposite conductivity type regions of the diodes is divided into a plurality of zones which are separated by a plurality of strips of high resistance. These strips may be formed by grooves through the surface of the end of the cylinder in predetermined configurations.

By using two nonparallel strips of high resistance, such as grooves, formed congruently in each semicircular region of one of the opposite conductivity type regions of the diode, with at least one of the grooves in the semicircular region being directed generally obliquely with respect to the point of emission on the semicircular portion of the diode emitting surface, and at least one of the grooves following a curved or nonlinear path, it is possible, by controlling current applied to individual diode sections, to continuously rotate the beam along the emitting surface. The rotational speed of the laser beam thus achieved, being entirely independent of electromechanical beam deflecting means, is dependent solely upon the speed by which electronic circuitry can achieve a change in current through selected diode sections.

SUMMARY OF THE INVENTION

One object of this invention is to provide a device which emits coherent light in an electronically selectable direction throughout 360° of revolution.

Another object is to provide a beacon for emitting a beam of coherent light capable of rotating at an electronically controllable rate.

Another object is to provide a cylindrically-shaped semiconductor junction laser having means for continuously shifting the beam emitting location on the surface of revolution of the laser across the entire intersection of the junction and the surface of revolution.

Briefly, in accordance with a preferred embodiment of the invention, there is provided apparatus for rotating a beam of coherent radiation comprising a monocrystalline semiconductor junction diode of right circular cylindrical shape having a pair of degenerate opposite conductivity type regions contiguous with and defining a thin planar p-n junction situated perpendicularly to the longitudinal axis of the diode. The diode includes a highly reflective circular surface, at least over the entire intersection of the junction with the circular surface, in the vicinity of predetermined beam emergence locations. A plurality of high resistance paths are disposed through the surface of one end of the cylindrical diode so as to divide each semicircular region of the one end identically into at least three differently shaped zones such that any radius of this end passes through each of the zones in either semicircular region. The paths are directed such that the net gain K along the radius in any direction Θ is related to the net gain per unit length $G_1$, $G_2$ and $G_3$ in each of the three zones respectively and to the portion of the radius $I_1$, $I_2$ and $I_3$ within each of the zones respectively according to the expressions.

$$K=G_1I_1+G_2I_2+G_3I_3$$

$$\frac{dK}{d\Theta}=0$$

and $$\frac{d^2K}{d\Theta_2}<0$$

where $I_1$, $I_2$ and $I_3$ are each separate functions of Θ.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawing in which:

DESCRIPTION OF THE PREFERRED EMBODIMENTS

Figures 1, 2, 3, 4, 5, 6:
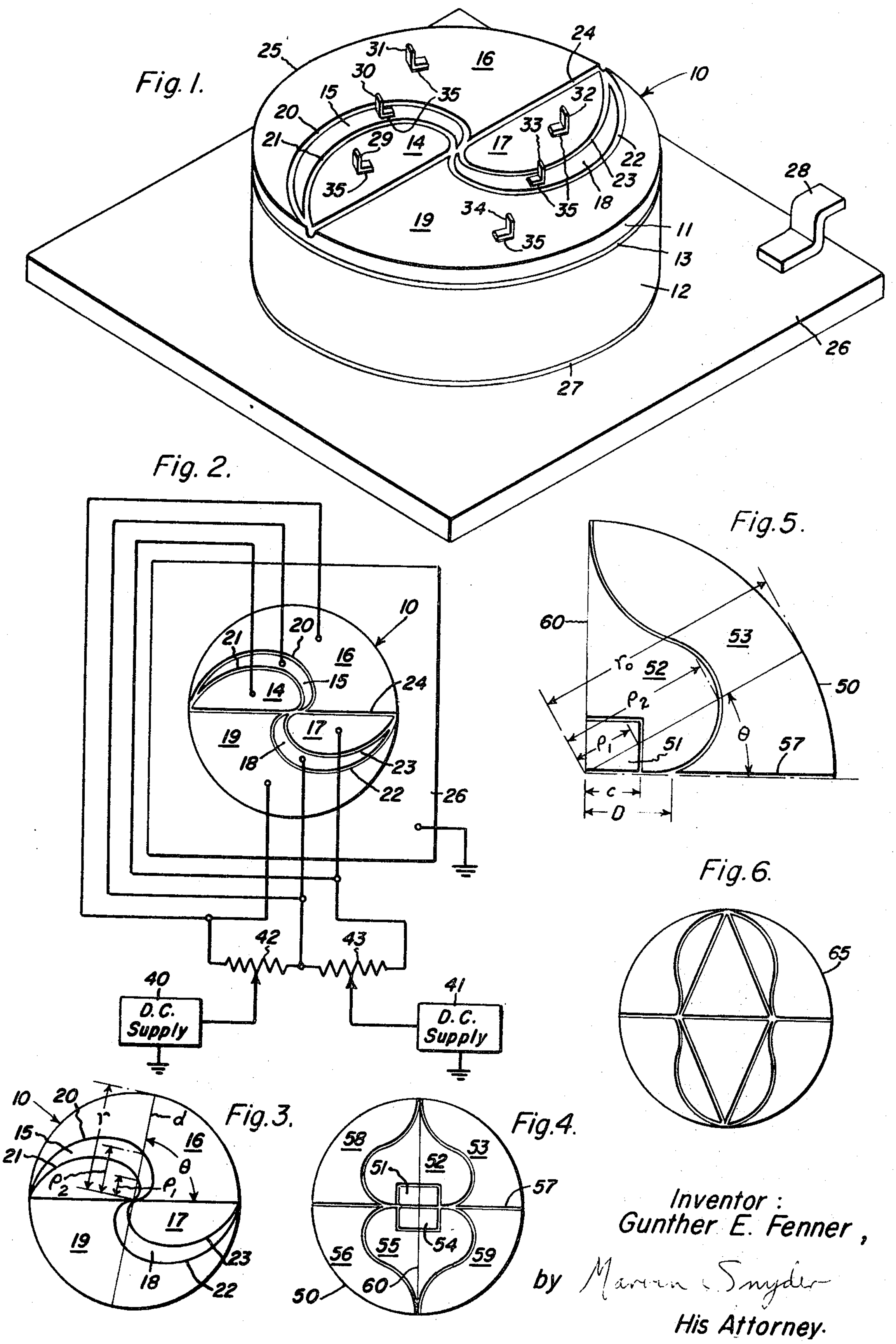
FIG. 1 is an isometric view of a right circular cylindrically-shaped junction laser having each semicircular region of one end divided identically into three differently shaped sections.
FIG. 2 is a top-view schematic diagram of the laser of FIG. 1 showing circuit means for energizing the laser.
FIG. 3 is an illustration of groove patterns of the laser of FIG. 1 for purposes of analysis.
FIG. 4 is a top-view schematic diagram of a second embodiment of a right circular cylindrically-shaped laser wherein each semicircular region is divided identically into differently shaped zones.
FIG. 5 is an enlarged diagram showing one quadrant of the laser of FIG. 4, for purposes of analysis.
FIG. 6 is a top-view schematic diagram of a third embodiment of a right circular cylindrically-shaped laser having each semicircular region thereof divided identically into differently shaped zones.

The laser shown in FIG. 1, which is of right circular cylindrical configuration, comprises a monocrystalline body 10 of semiconductive material having opposite conductivity type regions 11 and 12 which are doped to degeneracy. For illustrative purposes, region 11 is assumed to be of p-type conductivity, while region 12 is assumed to be of n-type conductivity.

Regions 11 and 12 are contiguous with, and define, a continuous intermediate p-n junction region 13 within body 10. Either one of the two degenerate regions, here selected to be p-type region 11, is divided into six segments 14–19 by a plurality of convoluted grooves 20–23 and a linear groove 24. Presence of these grooves results in separations between adjacent ones of zones 14–19, which are relatively thin. Grooves 20–24 are cut through the surface 25 of p-type region 11 to a uniform depth, almost to the depth of junction region 13. As a result, resistance of the p-type region measured between the bottom of any groove and junction region 13 is considerably higher than the resistance measured from the surface of any of zones 14–19 to junction region 13.

N-type region 12 is secured to a header 26 with a layer of donor type or electrically neutral solder 27. Header 26 is in turn connected to an electrode 28 by, for example, welding, brazing, etc. Preferably, header 26 is large in relation to diode 10, and thus also serves as a base or mechanical support member for the laser structure. Nonrectifying contact is made to sections 14–19 from electrodes 29–34 respectively, through an acceptor type or electrically neutral solder 35.

Semiconductor body 10 is preferably polished so that the surface of revolution, or annular surface, is circular to a high degree of accuracy. Moreover, the axis of the cylinder is normal to the plane of junction region 13. This parallelism is necessary in order that a standing wave pattern may be established within the semiconductor crystal to obtain high efficiency emission of coherent radiation through the circular surface of diode 10. Substantially infinitesimal areas of the circular surface at either end of any diameter in the vicinity of junction region 13 comprise the reflecting surfaces which define a resonant cavity there between, known in the art as Fabry-Perot surfaces. Thus, the cylindrical diode configuration from which the instant invention is fabricated is similar to that described by K. M. Arnold et al., Journal of Applied Physics 34, 10 (October 1963), and typically may be fabricated in the manner described in W. L. Bond, Review of Scientific Instruments 33, 372 (1962).

The material from which semiconductor crystal 10 is cut comprises, in general, a compound semiconductor or alloy of compound semiconductors in Group III–Group V of the Periodic Table. These semiconductors are described in greater detail in G. E. Fenner application, Ser. No. 532,417, filed Mar. 7, 1966 now U.S. Pat. No. 3,436,679 and assigned to the instant assignee. Both the n-type and p-type regions of semi-conductor crystal 10 are impregnated or doped with donor and acceptor activators, respectively, to cause degeneracy therein, as described in the aforementioned Fenner application. In gallium arsenide, for example, degeneracy is initially obtained when the excess negative conduction carrier concentration exceeds $10^{17}$ per cubic centimeter or when the excess positive conduction carrier concentration exceeds $10^{18}$ per cubic centimeter, as is well-known in the art. Materials suitable for rendering degenerate the n-type and p-type regions of the various semiconductors from which devices of the present invention may be fabricated depend upon the particular semiconductive material utilized, and are described in detail in the aforementioned Fenner application.

As one example of how a device may be constructed in accordance with the present invention as illustrated in FIG. 1, a square prism is cut from a monocrystalline ingot of n-type gallium arsenide which is impregnated or doped with approximately $10^{18}$ atoms per cubic centimeter of tellurium by growth from a melt of gallium arsenide containing a concentration of at least $3\times10^{18}$ atoms per cubic centimeter of tellurium. Thus, the prism is degenerately n-type. The p-n junction region is formed in a horizontal plane by diffusing zinc into all surfaces of the prism at a temperature of approximately 1,000° C. for approximately a half-hour using an evacuated sealed quartz tube containing the gallium arsenide prism and 10 milligrams of zinc, thus producing a plane p-n junction region of approximately 1,000 angstrom units in thickness at a distance of approximately 0.1 millimeter below all surfaces of the prism. The prism is then ground to a cylindrical configuration, removing all except one of the planar junctions. As ground, the cylinder may typically be approximately 18 mils in diameter by approximately 5 mils in length, plus sufficient additional length required to hold the cylinder. The circular surface is next polished to optical smoothness as described in the aforementioned W. L. Bond article. In the case of the aforementioned gallium arsenide diode, "optical smoothness" requires a maximum deviation of $\pm0.1$ micron in any diametrical measurements. Acceptor solder used with the gallium arsenide crystal is an alloy of 3% by weight of zinc and the remainder of indium, while donor solder for use therewith is of tin.

Although thickness of junction region 13 may be from 300 to 20,000 angstrom units, as determined by junction capacity measurement at zero bias, it is preferable to maintain junction thickness at approximately 500 to 2,000 angstrom units. This thickness determines both energy radiation efficiency and threshold current required for coherent emission. Junction thickness may also determine feasibility of operating the diode on a continuous wave basis. Moreover, junction thickness is important in determining temperature of operation and power output. Phenomenologically, minimum junction thickness is set by practical considerations and may be any small but finite dimension which prevents appreciable quantum mechanical tunneling under forward bias. Maximum junction layer thickness should not exceed approximately twice the longer of the two minority charge carrier diffusion lengths on either side of the intermediate or junction region.

To adapt the semiconductor junction laser for use in accordance with the present invention, a device as set forth above is provided with a plurality of strips of high resistance, resulting from separating grooves which are etched or otherwise formed in the cylindrical end surface 25 of one of the degenerate opposite conductivity type regions 11 and disposed therein so as to divide each semicircular region of end surface 25 identically into at least three differently shaped zones 14, 15 and 16, and 17, 18 and 19, such that any radius of surface 25 passes through each of the zones so formed in either semicircular region, such as zones 17, 18 and 19 in FIG. 1. Therefore, assuming that a diameter $d$ makes an angle $\Theta$ with groove 24, as diagrammatically illustrated in FIG. 3, grooves 20 and 22 are formed in accordance with the expression.

$$\rho_1 = A\Theta^2$$

where $\rho_1$, measured along radius $r$ from the origin, radius $r$ being collinear with diameter $d$, represents the radius vector of grooves 20 and 22, A being a constant, while grooves 21 and 23 are formed in accordance with the expression $$\rho_2 = B\Theta$$

where $\rho_2$, measured along radius $r$ from the origin, represents the radius vector of grooves 21 and 23, B being a constant. The thickness of p-type region 11 underlying each of the grooves therein, as shown in FIG. 1, may be made as thin as possible; however, the groove must not extend into junction region 13, in order to avoid scattering loss in the device.

The grooves may readily be formed by etching gallium arsenide diode 10 in a solution of, for example, 3 parts concentrated nitric acid to one part of 30% hydrofluoric acid, after first masking with a suitable inert masking material, such as black wax ("Apiezon W") or a photosensitive polymerizable material, all portions of the diode not to be etched. The etching process is preferably conducted in a plurality of steps, typically from 3 to 10. During each step, the diode is exposed to the etching solution for approximately 1 second, and then quickly rinsed in water. After each step, groove resistance, or resistance between each pair of adjacent zones of region 11, is measured. A typical starting resistance is about 0.2 ohm and a suitable device is completed when this resistance has increased to about 1 ohm or more. The masking material is next dissolved in a suitable solvent therefor, such as acetone in the case of black wax, and the electrodes are attached, resulting in a device as shown in FIG. 1.

Alternatively, zones 14–19 may be formed in region 11 by other methods, such as by diffusion of impurities through a mask, in order to obtain the desired resistance between zones. Accordingly, it should be understood that the grooves in any configuration illustrated herein may be replaced by strips of high resistance formed in this manner.

In operation, the device of FIG. 1 is connected as shown schematically in FIG. 2 wherein like numerals indicate like elements, with header 26 grounded. A pair of sources of direct current 40 and 41, preferably of independently variable amplitude, are applied to movable taps of a pair of potentiometers 42 and 43 respectively. Potentiometers 42 and 43 are connected in series, with the common junction therebetween being connected to sections 15 and 18 of diode 10 in parallel. The other end of potentiometer 42 is connected to sections 16 and 19 of diode 10 in parallel, while the other end of potentiometer 43 is connected to sections 14 and 17 of diode 10 in parallel. Although the movable taps on potentiometers 42 and 43 may be manually positioned, it should be understood that this positioning may be accomplished automatically in a programmed fashion by, for example, operation from motor driven cams. Alternatively, three electromechanically or electronically programmed sources of direct current may be utilized for energizing each of the three parallel-connected pairs of diode sections respectively, in place of DC supplies 40 and 41 and potentiometers 42 and 43.

The diode may be subjected to DC pulses at high current density levels, such as approximately 2,000 to 20,000 amperes per square centimeter for a gallium arsenide diode. To avoid overheating the diode, the pulse width is conveniently kept within a level of approximately 1 to 10 microseconds. However, since the threshold current density required for stimulated emission of coherent radiation from a gallium arsenide diode is related to diode temperature, the diode may be subjected to a low temperature in order to establish a low threshold and preclude necessity for a high current source. For example, immersion of a gallium arsenide diode in a dewar of liquid air at a temperature of approximately 77° K. establishes a threshold of approximately 2,000 amperes per square centimeter. At liquid hydrogen temperatures, or approximately 20° K., the threshold is decreased to less than 500 amperes per square centimeter. Hence, for a junction area of approximately .0005 square centimeter, a 1.0 ampere pulsed current source is approximately as sufficient to produce coherent radiation from a gallium arsenide diode at 20° K. as a 0.25 ampere pulsed current source is to produce coherent radiation from a diode at 77° K. With sufficient cooling, continuous wave operation may be achieved.

As shown in FIG. 2, forward bias is applied to each of the sections of diode 10. This bias may be either steady or pulsed, depending upon whether or not continuous wave operation is to transpire. Diode 10 emits coherent radiation from the circular surface in a direction parallel to the plane of the junction. As long a current density is uniform throughout the junction, the laser beam emerges parallel to the junction but at an indeterminate location; that is, along an indeterminate diameter of the cylindrical diode. Since, in each of the sections 14–19 of the semiconductive diode material, net gain per unit length is directly proportional to current density, as is well-known in the art, equal current density within each of the sections produces beam emission at this indeterminate location, provided, of course, that the threshold level of current density required for lasing is exceeded in each of the sections. However, since any change in current density within one of the sections changes the net gain per unit length of that section, movement of the tap on either of potentiometers 42 and 43 can produce a change in direction (directional deflection) of the output beam. This phenomenon results from the fact that the beam tends to position itself along the diameter in which the net gain is a maximum. Therefore, beam direction can be changed in the plane of the junction by a change of current in any of the diode sections.

The conditions for lasing along any diameter $d$ of diode 10 at an angle Θ with groove 24, as illustrated in FIG. 3, and with diode 10 connected as shown in FIG. 2, may be represented by the following expressions:

(1) $$K = G_1 l_1 + G_2 l_2 + G_3 l_3$$

(2) $$\frac{dK}{d\Theta} = 0$$

and (3) $$\frac{d^2K}{d\Theta^2} < 0$$

where K represents net gain along a radius collinear with diameter $d$, $G_1$, $G_2$ and $G_3$ represent the net gain per unit length in either one of each pair of parallel-connected laser sections 14 and 17, 15 and 18, and 16 and 19, respectively, and $l_1$, $l_2$ and $l_3$ represent the portion of diameter $d$ within either one of each pair of parallel-connected laser sections 14 and 17, 15 and 18, and 16 and 19, respectively. From the foregoing, it is evident that net gain along the entire diameter $d$, with diode 10 energized as illustrated in FIG. 2, may be written as $$2(G_1 l_1 + G_2 l_2 + G_3 l_3)$$

Moreover, since from FIG. 3 it can be seen that $$l_1 = \rho_1 = A\Theta^2$$

$$l_2 = \rho_2 - \rho_1 = B\Theta - A\Theta^2$$

and $$l_3 = \rho_3 - (\rho_2 + \rho_1) = r$$

then Equation 1 can be rewritten as $$K = (G_1 - G_2)A\Theta^2 + (G_2 - G_3)B\Theta + G_3 r$$

The direction of emission may be found by solving expression (2) for Θ to obtain (4) $$\Theta = \frac{B}{2A}\,\frac{G_2 - G_3}{G_2 - G_1}$$

Further, solving expression (3) results in the requirement that (5) $$G_2 > G_1$$

The net gain per unit length in any section is directly proportional to current density therein, as is well-known. Hence, since the areas of sections 14–19 are constant, the net gain per unit length in any of these sections is directly proportional to the current therein.

Expression (4) may thus be rewritten as $$(6) \qquad \Theta=\frac{B}{2A}\frac{\frac{I_2}{a_2}-\frac{I_3}{a_3}}{\frac{I_2}{a_2}-\frac{I_1}{a_1}}$$

where $I_1$, $I_2$ and $I_3$ represent the total current in the parallel-connected laser sections 14 and 17, 15 and 18, and 16 and 19, respectively, and $a_1$, $a_2$ and $a_3$ represent the total area of the parallel-connected laser sections 14 and 17, 15 and 18, and 16 and 19, respectively.

Since the areas $a_1$, $a_2$ and $a_3$ are constants, it can be seen from expression (6) and $\Theta$ can be linearly varied from 0 to $\pi$ radians simply by varying currents $I_1$, $I_2$ and $I_3$. For example, assuming $G_1$, $G_2$ and $G_3$ are all above the threshold of lasing, or minimum gain per unit length required to achieve lasing, and assuming $$I_2=\frac{a_2}{a_3}I_3$$

then $\Theta$, as expressed by Equation 6, is 0. As $I_2$ is thereafter increased, with $I_1$ and $I_2$ either remaining constant or decreasing, $\Theta$ approaches a value of 1. A subsequent increase of $I_1$ (within the limits imposed by expression (5)) decreases the denominator in expression (6), so that $\Theta$ can be linearly increased to a value of $\pi$. At this value, as at 0, emission occurs substantially along groove 24; hence, a discontinuous alteration in $I_1$ and $I_2$ to those values establishing emission at $\Theta=0$ radians permits continued rotation of the beam with but a substantially imperceptible interruption due to the discontinuity. In this manner, the laser may be operated as a beacon. However, individual control of currents $I_1$, $I_2$ and $I_3$ can provide controlled rotation of the beam over limited angles and in any desired sequence. Moreover, discontinuous changes in angle of emission may be obtained by discontinuous alteration of currents $I_1$, $I_2$ and $I_3$. Hence, the versatility of this device is manifest.

FIG. 4 illustrates the groove patterns of a second embodiment of the invention. In FIG. 4, the groove patterns in the surface of one of the degenerate regions of one conductivity type in a diode 50 divide this surface into identical semicircular sectors separated by a linear groove 57. Typically, corresponding sections in diagonally-opposed areas would be connected in parallel. Thus, sections 51, 52 and 53 of one semicircular sector are connected in parallel with sections 54, 55 and 56 respectively of the diagonally-opposed area of the other semicircular sector. If energization of each pair of parallel-connected sections is separately controllable, the emitted beam may be made to sweep diagonally-opposed sectors consisting entirely of sections 51–56 in controllable fashion. Similar connections to and energization of sections 51, 52 and 58 of the one semicircular sector in parallel with sections 54, 55 and 59 respectively in the remaining semicircular sector result in ability to controllably sweep the remaining diagonally-opposed sectors with the emitted beam. The diagonally-opposed sectors are each bounded by linear groove 57 and a diameter 60 perpendicular thereto.

That control of emission from diode 50 can be achieved in the aforementioned manner may be proven as follows:

Along any radius $r_0$ at an angle $\Theta$ in any quadrant of the diode of FIG. 4, such as the quadrant shown in FIG. 5, $\rho_1$ is the distance from the origin to the boundary between sections 51 and 52, and $\rho_2$ is the distance from the origin to the boundary between sections 52 and 53. Assume also that at $\Theta=0$, $\rho_1=c$ and $\rho_2=$D. Thus, $$\rho_1=\frac{c}{\cos\Theta}$$

and $$\rho_2=De^{\alpha\Theta}$$

where D is a constant, $e$ is the base of natural logarithms, and $\alpha$ is also a constant. The net gain K along the optical path $r_0$ may, through the criterion of Equation 1, be expressed as $$(7) \qquad K=(G_a-G_b)\frac{c}{\cos\Theta}+(G_b-G_cDe^{\alpha\Theta}\times G_cr_o$$

where $G_a$, $G_b$ and $G_c$ represent the gain in sections 51, 52 and 53, respectively. To lase, the following conditions must be met:

$$(8) \qquad \frac{dK}{d\Theta}=0$$

and $$(9) \qquad \frac{d^2K}{d\Theta^2}<0$$

Solving expression (8):

$$\frac{dK}{d\Theta}=(G_aG_b)\frac{c\sin\Theta}{\cos^2\Theta}+(G_b-G_c)\alpha De^{\alpha\Theta}=0$$

Therefore, $$(10) \qquad \frac{\sin\Theta}{e^{\alpha\Theta}\cos^2\Theta}=\frac{\alpha D}{c}\frac{G_c-G_b}{G_a-G_b}$$

Over small angles of $\Theta$, Equation 10 reduces to $$(11) \qquad \Theta=\frac{\alpha D}{c}\frac{G_c-G_b}{G_a-G_b}$$

and by proper selection of parameters $\alpha$, D and $c$, Equation 11 may be written $$(12) \qquad \Theta\approx\frac{G_c-G_b}{G_a-G_b}$$

while expression (9) yields the requirement that $$G_c>G_b$$

From Equation 10, it can be seen that the beam emitted by the diode of FIG. 4 may be rotated (and from Equation 12 it can be seen that this rotation is linear, at least over small angles) by changing current distribution, and hence current density, in each of sections 51, 52 and 53. Of course, this is best accomplished by connecting corresponding sections in diagonally opposed sectors in parallel, in the manner described in conjunction with the apparatus of FIG. 2.

FIG. 6 illustrates still another groove configuration for producing a beacon-type semiconductor diode laser 65. An analysis similar to that given for the previous groove configurations can be performed with regard to this laser also, to prove that beam rotation is obtainable. This analysis again comprises writing the expression for net gain along any emitting path, setting the first derivative of the net gain with respect to the angle of emission equal to zero and solving for the angle, while satisfying the requirement that the second derivative of the net gain with respect to the angle of emission be negative. The resulting expression will be similar to that of Equation 12, showing again that by proper current distribution, beam rotation may be achieved.

The foregoing describes a cylindrically-shaped semiconductor device which can emit coherent light in an electronically selectable direction throughout 360° of revolution. The beam may be made to rotate at an electronically controllable rate, or may be discontinuously shifted across the entire intersection of the junction and the circular surface.

While only certain preferred features of the invention have been shown by way of illustration, many modifications and changes will occur to those skilled in the art.

It is, therefore, to be understood that the appended claims are intended to cover all such modifications and changes as fall within the true spirit and scope of the invention.

I claim:

1. In apparatus for rotating a beam of coherent radiation, the combination comprising:

a monocrystalline semiconductor junction diode of right circular cylindrical shape having a pair of degenerate opposite conductivity type regions contiguous with and defining a thin planar p-n junction situated perpendicularly to the longitudinal axis of said diode, said diode having a highly reflective circular surface at least over the entire intersection of said junction with said circular surface in the vicinity of predetermined beam emergence locations, a plurality of high resistance paths disposed through the surface of one end of said cylindrical diode so as to divide each semicircular region of said one end into at least three differently shaped zones such that any radius of said end passes through each of said zones in either semicircular region, said paths being directed such that the net gain K along said radius in any direction $\Theta$ is related to the net gain per unit length $G_1$, $G_2$ and $G_3$ in each of the three zones traversed by said radius respectively and the portion of said radius $I_1$, $I_2$ and $I_3$ within each of said zones traversed by said radius respectively according to the expressions $$K=G_1I_1+G_2I_2+G_3I_3$$

$$\frac{dK}{d\Theta}=0$$

and $$\frac{d^2K}{d\Theta^2}<0$$

where $I_1$, $I_2$ and $I_3$ are each separate functions of $\Theta$; and bias means electrically coupled to said diode for controllably forward biasing the sections of said diode underlying each of said zones.

2. The apparatus of claim 1 wherein said high resistance paths comprise grooves through the surface of said one end of said diode.

3. The apparatus of claim 2 including means electrically coupling each respective zone of one of said sectors to each corresponding zone respectively of the other of said sectors.

4. The apparatus of claim 1 including means electrically coupling each respective zone of one of said sectors to each corresponding zone respectively of the other of said sectors.

5. The apparatus of claim 1 wherein said sector comprises a semicircular region.

6. The apparatus of claim 1 wherein said sector comprises a quadrant.

7. In apparatus for rotating a beam of coherent radiation, the combination comprising:

a monocrystalline semiconductor junction diode of generally cylindrical shape having a pair of degenerate opposite conductivity type regions contiguous with and defining a thin planar p-n junction situated perpendicularly to the longitudinal axis of said diode, said diode having a highly reflective annular surface at least over the entire intersection of said junction with said annular surface in the vicinity of predetermined beam emergence locations, a plurality of high resistance paths disposed through the surface of one end of said diode so as to divide a sector of said end into at least three differently shaped zones such that any straight line on the surface of said end in said sector passing through the intersection of the longitudinal axis and said end also passes through each of said zones, said paths being directed such that the net gain K along said straight line in any direction $\Theta$ is related to the gain $G_1$, $G_2$ and $G_3$ in each of the three zones respectively and the total portion of said straight line $I_1$, $I_2$ and $I_3$ within said zone respectively according to the expressions $$K=G_1I_1+G_2I_2+G_3I_3$$

$$\frac{dK}{d\Theta}=0$$

and $$\frac{d^2K}{d\Theta^2}<0$$

where $I_1$, $I_2$ and $I_3$ are each separate functions of $\Theta$; and bias means electrically coupled to said diode for controllably forward biasing the sections of said diode underlying each of said zones.

8. The apparatus of claim 7 wherein said high resistance paths comprise grooves through the surface of said end.

9. The apparatus of claim 7 wherein said diode is of right circular cylindrical shape, said annular surface is circular, and said straight line on the surface of said end in said sector comprises a diameter of said end.

10. The apparatus of claim 9 wherein said high resistance paths comprise grooves through the surface of said end.

References Cited

UNITED STATES PATENTS

| | | | |
|---|---|---|---|
| 3,402,366 | 9/1968 | Williams et al. | 331—94.5 |
| 3,436,679 | 4/1969 | Fenner | 331—94.5 |

RONALD L. WIBERT, Primary Examiner

E. BAUER, Assistant Examiner

U.S. Cl. X.R.

317—234